(12) United States Patent
Ikawa et al.

(10) Patent No.: US 7,193,937 B2
(45) Date of Patent: Mar. 20, 2007

(54) OBJECTIVE LENS DRIVING DEVICE AND OPTICAL DISK APPARATUS

(75) Inventors: Yoshihiro Ikawa, Higashiosaka (JP); Hiroshi Yamamoto, Yawata (JP); Koji Ieki, Onsen-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 583 days.

(21) Appl. No.: 10/616,266

(22) Filed: Jul. 9, 2003

(65) Prior Publication Data

US 2004/0066714 A1  Apr. 8, 2004

(30) Foreign Application Priority Data

Oct. 4, 2002  (JP) .............................. 2002-292177

(51) Int. Cl.
*G11B 7/00* (2006.01)
(52) U.S. Cl. .................................. 369/44.15; 369/44.22
(58) Field of Classification Search ...................... None
See application file for complete search history.

(56) References Cited

U.S. PATENT DOCUMENTS 5,657,172 A * 8/1997 Shibata et al. .............. 359/824
5,706,272 A * 1/1998 Ezawa ......................... 720/676
5,905,255 A * 5/1999 Wakabayashi et al. ... 250/201.5
6,570,720 B2 * 5/2003 Kawano ....................... 359/813
6,788,638 B1 * 9/2004 Choi ......................... 369/244.1
2002/0071189 A1* 6/2002 Ohno ........................... 359/813

FOREIGN PATENT DOCUMENTS

| JP | 10-124901 | 5/1998 |
| JP | 11-283258 | 10/1999 |
| JP | 11-312327 | 11/1999 |

* cited by examiner

Primary Examiner—Thang V. Tran
Assistant Examiner—Tawfik Goma
(74) Attorney, Agent, or Firm—Hamre, Schumann, Mueller & Larson, P.C.

(57) ABSTRACT

Tracking coils are attached to outer surfaces of two focusing coils. Inside the focusing coils, a first magnet and a second magnet are arranged respectively. A third magnet is arranged so as to face the first magnet and the second magnet via the tracking coils. An open end of a first yoke for holding the first magnet and an open end of a second yoke for holding the second magnet are connected by a bridging yoke. Since a magnetic flux is formed in the bridging yoke, pitching vibrations can be suppressed and a driving sensitivity improves owing to an increase in an effective magnetic flux.

4 Claims, 7 Drawing Sheets

OBJECTIVE LENS DRIVING DEVICE AND OPTICAL DISK APPARATUS

BACKGROUND OF THE INVENTION

1. Field of the Invention

The present invention relates to an objective lens driving device. In particular, the present invention relates to an objective lens driving device used in a recording and reproducing apparatus that irradiates an optical spot on a disk-like recording medium and records and/or reproduces information optically. Also, the present invention relates to an optical disk apparatus including such an objective lens driving device.

2. Description of Related Art

In a conventional objective lens driving device, an objective lens for forming an optical spot on a recording surface of a disk is driven and translated in a direction perpendicular to the disk surface (hereinafter, referred to as a "focusing direction") and a radial direction of the disk (hereinafter, referred to as a "tracking direction"). An optical disk apparatus developed in response to densification is provided with a function of correcting an optical coma aberration in order to achieve excellent recording and reproducing characteristics. For this purpose, it is necessary to drive the objective lens not only in the focusing direction and the tracking direction but also in a direction rotating around an axis parallel with a direction tangent to the circumference of the disk (or to a recording track on the disk) (hereinafter, referred to as a "radial tilting direction"). Such an objective lens driving device is disclosed in JP 11(1999)-283258 A, for example. In the following, by taking the technology disclosed in this document as an example, a conventional objective lens driving device will be described with reference to the accompanying drawings.

FIG. 6 is a perspective view showing a configuration of the conventional objective lens driving device, and FIG. 7 is a plan view showing the arrangement of coils and magnets in the conventional objective lens driving device. In FIGS. 6 and 7, an arrow Fo indicates a focusing direction, an arrow Tr indicates a tracking direction, an arrow Ti indicates a radial tilting direction, and an arrow S indicates a direction tangent to the circumference of a disk, which is not shown in the figures (or to a recording track on the disk) (hereinafter, referred to as a "circumferential direction").

Focusing coils 54L and 54R and a tracking coil 55 are fixed firmly to a lens holder 52 that holds an objective lens 51, thus constituting a movable portion 64. One end of each of elastically-deformable supports 53a, 53b, 53c and 53d is fixed firmly to the lens holder 52, while the other end thereof is fixed firmly to a fixing portion 62, so that the movable portion 64 is supported in a manner translatable in the focusing direction Fo and the tracking direction Tr and rotatable in the radial tilting direction Ti. Further, the fixing portion 62 is fixed to a supporting base 63.

Magnets 58 and 59 are arranged so as to face each other and attached to yokes 56a and 56b, respectively, thus constituting a magnetic circuit 65R. In a magnetic gap between the magnets 58 and 59, the focusing coil 54R and the tracking coil 55 are arranged. Similarly, magnets 60 and 61 are arranged so as to face each other and attached to yokes 57a and 57b, respectively, thus constituting a magnetic circuit 65L. In a magnetic gap between the magnets 60 and 61, the focusing coil 54L and the tracking coil 55 are arranged. By an interaction between these two magnetic circuits 65R, 65L and an electric current passed through the focusing coils 54L and 54R and the tracking coil 55, namely, an electromagnetic force, a driving system is formed. The electric current is supplied to the focusing coils 54L and 54R and the tracking coil 55 via the supports 53a, 53b, 53c and 53d.

Next, the arrangement of these coils and magnetic poles of the magnets will be described referring to FIG. 7. The magnets 58 and 59 are both magnetized in the same direction as the arrow S (the circumferential direction of the disk) and supply a magnetic flux J1. On the other hand, the magnets 60 and 61 are magnetized in the direction opposite to the arrow S and supply a magnetic flux J2. Other than the main magnetic fluxes J1 and J2, a leakage magnetic flux H1 is generated between the yokes 56a and 57a and a leakage magnetic flux H2 is generated between the yokes 56b and 57b because the magnetic circuits 65R and 65L are arranged close to each other.

The following is a description of an operation of the conventional objective lens driving device constituted as above, with reference to the accompanying drawings. In FIG. 7, when an electric current I1 is supplied to the focusing coil 54R, an electromagnetic force in the focusing direction Fo is generated in a part subjected to the magnetic flux J1 (a point P1) according to the Fleming's rule. Similarly, when an electric current I2 is supplied to the focusing coil 54L, an electromagnetic force in the focusing direction Fo is generated in a part subjected to the magnetic flux J2 (a point P2). As a result, the movable portion 64 is driven in the focusing direction Fo. However, an electromagnetic force in a direction opposite to the focusing direction Fo is generated in a part subjected to the leakage magnetic flux H1 (a point P3).

In terms of driving in the radial tilting direction Ti, a moment generated by a difference between the electric current I1 and the electric current I2, namely, a difference between the electromagnetic force in the focusing direction Fo acting on the focusing coil 54R and that acting on the focusing coil 54L allows the movable portion 64 to tilt.

Since the operation of passing an electric current thorough the tracking coil 55 so as to generate an electromagnetic force is similar to that for the focusing coils 54R and 54L, the description thereof will be omitted here.

In the conventional objective lens driving device constituted as above, the electromagnetic force in a direction opposite to the focusing direction Fo is generated in the part subjected to the leakage magnetic flux H1. Accordingly, rotating vibrations around the tracking direction Tr, so-called pitching vibrations, occur in the movable portion 64 including the objective lens 51, so that an aberration of an optical spot is generated, which causes a problem in recording and reproducing.

SUMMARY OF THE INVENTION

It is an object of the present invention to solve the problem described above and to provide an objective lens driving device that suppresses pitching vibrations and improves a driving sensitivity and an optical disk apparatus using the same.

In order to achieve the above-mentioned object, an objective lens driving device according to the present invention includes an objective lens for focusing a light beam on a disk, a lens holder for holding the objective lens, a support for supporting the lens holder with respect to a fixing portion in a manner translatable in a focusing direction and a tracking direction and rotatable in a radial tilting direction, and a driving system for driving the lens holder along three axes of the focusing direction, the tracking direction and the radial tilting direction. The driving system includes two focusing coils that are each wound in a substantially rectangular toroidal shape around a winding axis parallel with an optical axis direction of the objective lens, a tracking coil that is wound around a winding axis parallel with a circumferential direction of the disk and attached to outer surfaces of the focusing coils, a first magnet that has a magnetic pole direction parallel with the circumferential direction of the disk and is arranged inside one of the focusing coils, a second magnet that has a magnetic pole direction opposite to that of the first magnet and is arranged inside the other focusing coil, a third magnet and a fourth magnet that are arranged facing the first magnet and the second magnet respectively while forming a magnetic gap such that the tracking coil and the focusing coils are located in the magnetic gap, a first yoke that is located outside the magnetic gap and holds the first magnet, a second yoke that is located outside the magnetic gap and holds the second magnet, and a bridging yoke for connecting an open end of the first yoke and an open end of the second yoke.

Further, an optical disk apparatus according to the present invention includes the above-described objective lens driving device of the present invention.

DESCRIPTION OF THE PREFERRED EMBODIMENTS

Since an objective lens driving device according to the present invention includes a bridging yoke for connecting an open end of a first yoke and an open end of a second yoke, it is possible to prevent the generation of a leakage magnetic flux that crosses focusing coils between the first yoke and the second yoke. Thus, pitching vibrations of a movable portion can be suppressed. Also, the efficiency of magnetic utilization can be raised, making it possible to improve a focusing driving sensitivity.

Furthermore, since the bridging yoke is arranged so as not to interfere with a tracking coil, it is possible to improve a tracking driving sensitivity without reducing an effective dimension of the tracking coil or increasing the thickness of the objective lens driving device.

Preferably the above-described objective lens driving device according to the present invention further includes a third yoke that is arranged outside the magnetic gap and holds both the third magnet and the fourth magnet. This prevents the generation of a leakage magnetic flux. Also, since a closed-loop magnetic flux circuit can be formed together with the bridging yoke, the efficiency of magnetic utilization improves, allowing a further improvement in the driving efficiency.

Moreover, in the above-described objective lens driving device according to the present invention, it is preferable that the third magnet and the fourth magnet are provided as a single two-pole magnetized magnet. This makes it possible to obtain a large magnetomotive force with a small device.

In addition, an optical disk apparatus according to the present invention includes the above-described objective lens driving device of the present invention. This makes it possible to correct an optical coma aberration, thus suppressing the aberration of the optical spot so as to improve the quality of recording and reproducing signals.

The following is a description of an embodiment of the present invention, with reference to the accompanying drawings.

Figure 1:
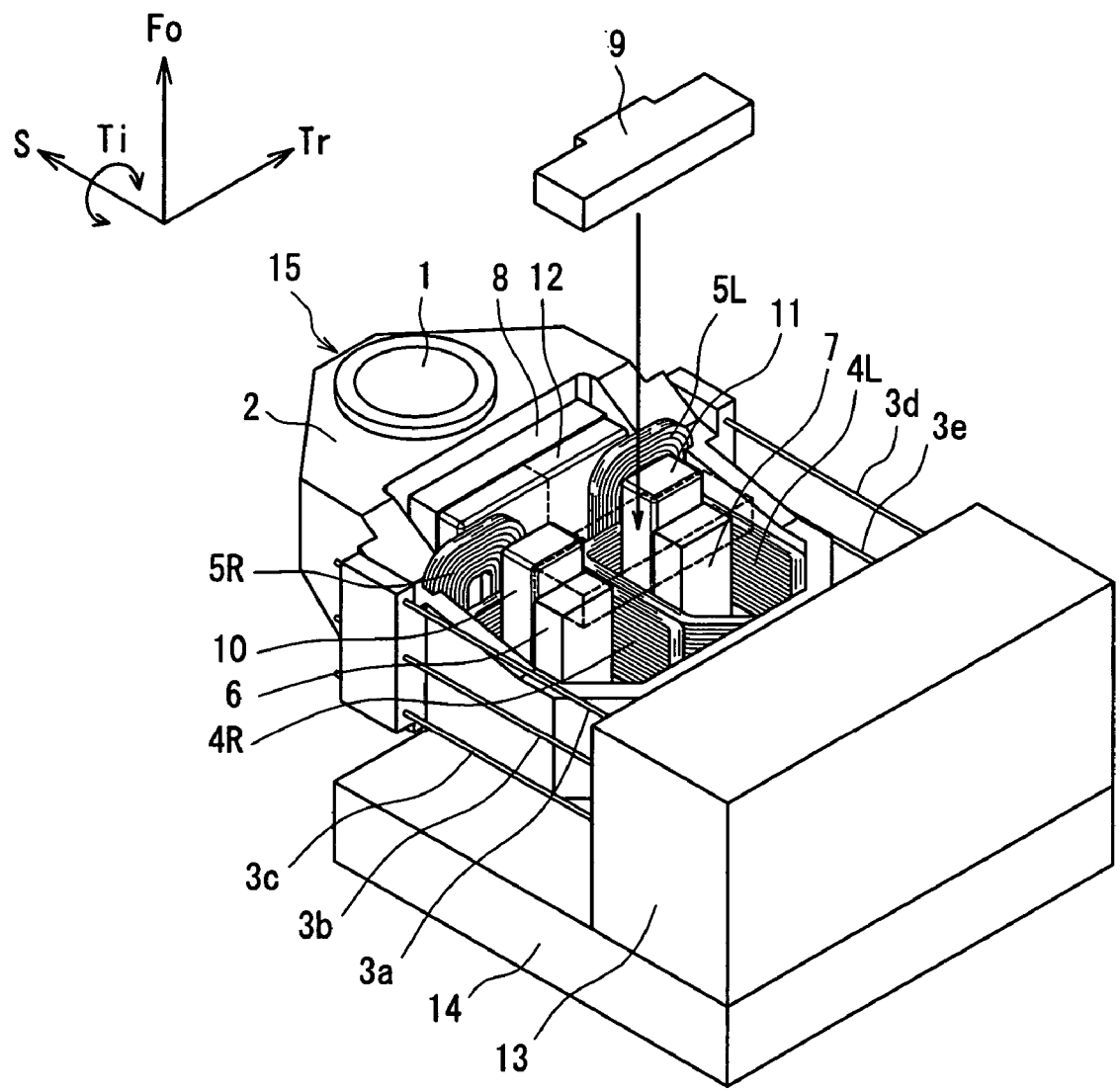
FIG. 1 is a perspective view showing a configuration of an objective lens driving device in an embodiment of the present invention.
Figure 2:
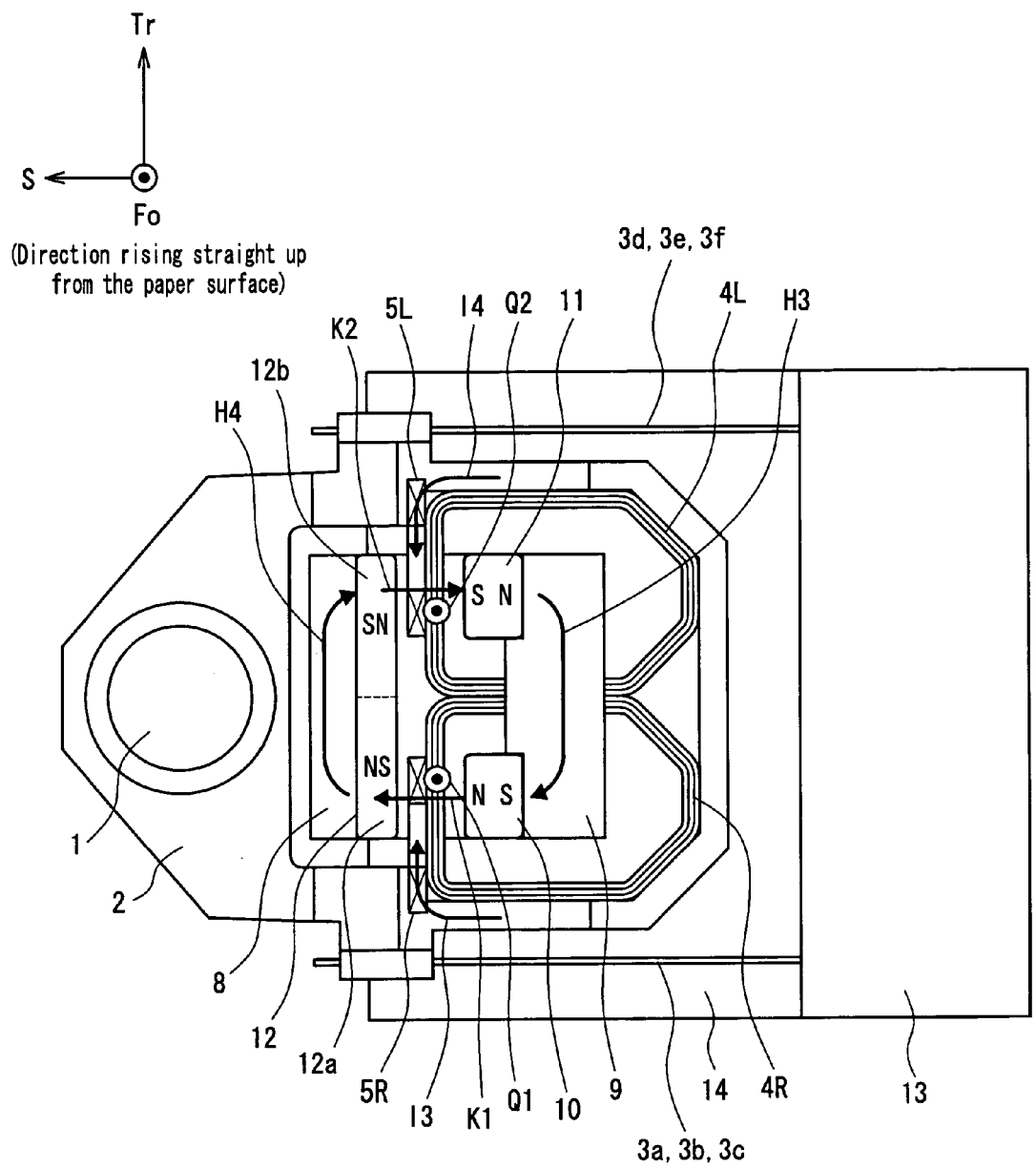
FIG. 2 is a plan view showing an arrangement of coils and magnets of the objective lens driving device in the embodiment of the present invention.
Figure 3:
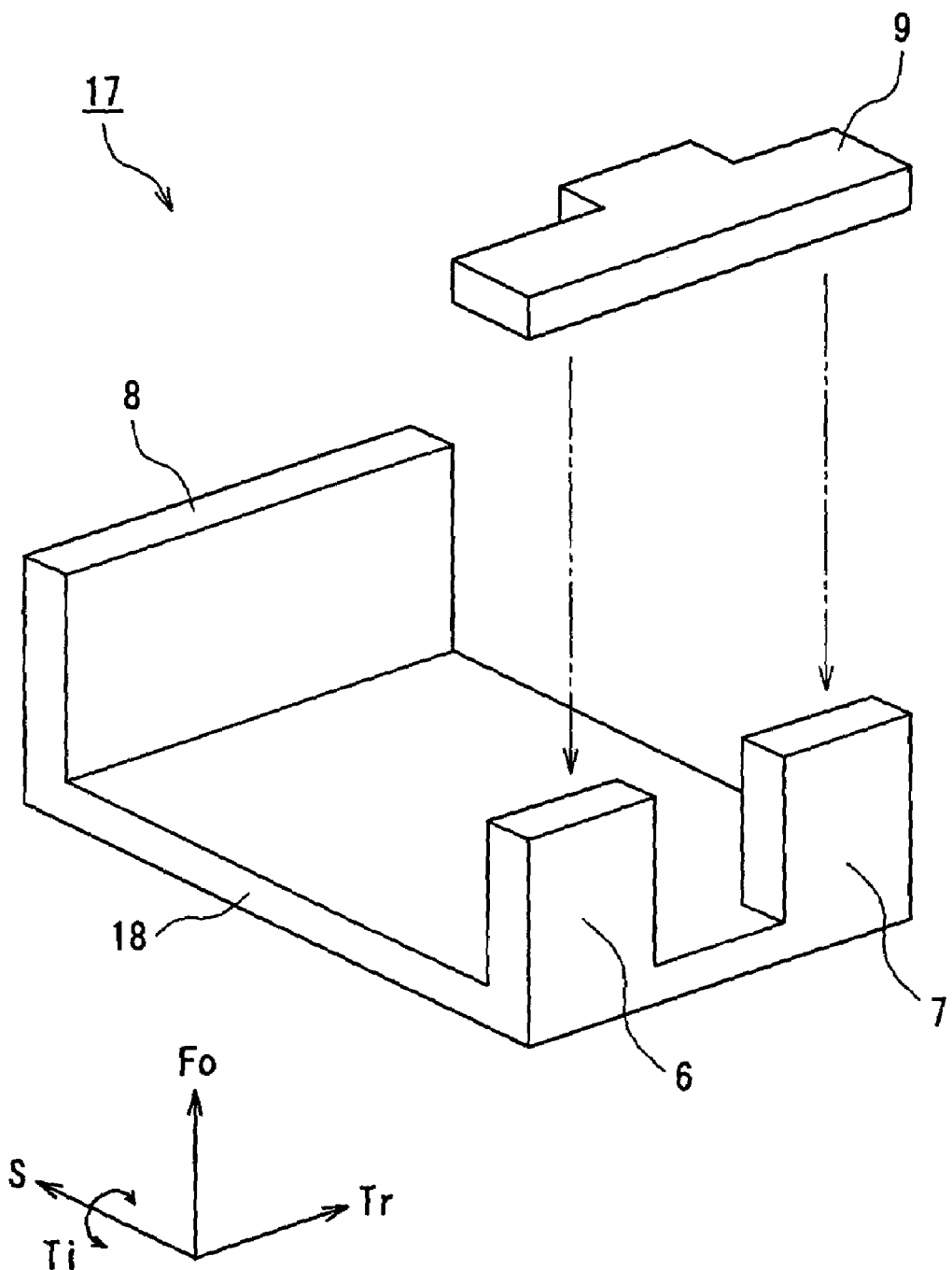
FIG. 3 is a perspective view showing a yoke used in the objective lens driving device shown in FIG. 1.

FIG. 1 is a perspective view showing a configuration of an objective lens driving device in an embodiment of the present invention, and FIG. 2 is a plan view showing an arrangement of coils and magnets of the objective lens driving device in the embodiment of the present invention. FIG. 3 is a perspective view showing a yoke used in the objective lens driving device shown in FIGS. 1 and 2. In FIGS. 1 to 3, an arrow Fo indicates a focusing direction, an arrow Tr indicates a tracking direction, an arrow Ti indicates a radial tilting direction, and an arrow S indicates a circumferential direction of a disk, which is not shown in the figures.

Two focusing coils 4R and 4L and two tracking coils 5R and 5L are attached to a lens holder 2 that holds an objective lens 1. The two focusing coils 4R and 4L are used for tilting drive as in the conventional example, and the operation thereof will be described later. The objective lens 1, the lens holder 2, the focusing coils 4R and 4L and the tracking coils 5R and 5L integrally constitute a movable portion 15. One end of each of six linear elastically-deformable supports 3a, 3b, 3c, 3d, 3e and 3f (the support 3f is not shown because it is hidden) is fixed to an outer end portion of the lens holder 2, while the other end thereof is fixed to a fixing portion 13. Thus, the movable portion 15 is supported elastically with respect to the fixing portion 13 in a manner translatable in the focusing direction Fo and the tracking direction Tr and rotatable in the radial tilting direction Ti. The supports 3a, 3b, 3c, 3d, 3e and 3f may be made of an electrically conductive material such as a beryllium copper alloy or phosphor bronze. They serve both as a member for supporting the movable portion 15 and as a member for passing an electric current to the coils 4R, 4L, 5R and 5L. Further, the fixing portion 13 is fixed to a supporting base 14. The supporting base 14 is provided with magnetic circuits for supplying a magnetic flux to the focusing coils 4R, 4L and the tracking coils 5R, 5L, and the configuration of the magnetic circuits will be described herein.

As shown in FIG. 3, a yoke 17 is formed of a magnetic material having a substantially "U" shape when viewed in the tracking direction Tr. On a base 18 of the yoke 17, a first yoke 6 and a second yoke 7 are disposed so as to face a third yoke 8. The first yoke 6, the second yoke 7 and the third yoke 8 are all provided perpendicularly to the base 18 along the focusing direction Fo. The yoke 17 is fixed firmly to the supporting base 14 via the base 18.

As shown in FIGS. 1 and 2, a first magnet 10 is fixed firmly to a surface of the first yoke 6 facing the third yoke 8, and a second magnet 11 is fixed firmly to a surface of the second yoke 7 facing the third yoke 8. Further, a third magnet 12 is fixed firmly to a surface of the third yoke 8 facing the first yoke 6 and the second yoke 7. The first magnet 10 and the second magnet 11 are spaced away from the third magnet 12, between which a magnetic gap is formed.

The two focusing coils 4R and 4L are each wound in a substantially rectangular toroidal shape around a winding axis parallel with the focusing direction Fo. The two tracking coils 5R and 5L, each wound around a winding axis parallel with the circumferential direction of the disk, are attached respectively to outer surfaces of the two focusing coils 4R and 4L. The first magnet 10 fixed firmly to the first yoke 6 and the second magnet 11 fixed firmly to the second yoke 7 are inserted with clearance in the two focusing coils 4R and 4L, respectively. At this time, the tracking coil 5R and a part of the focusing coil 4R are inserted with clearance in the magnetic gap formed between the first magnet 10 and the third magnet 12. Also, the tracking coil 5L and a part of the focusing coil 4L are inserted with clearance in the magnetic gap formed between the second magnet 11 and the third magnet 12.

Moreover, at open ends of the fist yoke 6 and the second yoke 7, a fourth yoke (bridging yoke) 9 is connected and fixed so as to bridge the first yoke 6 and the second yoke 7, so that a magnetic path connecting the first yoke 6 and the second yoke 7 is formed in the fourth yoke. Incidentally, although the fourth yoke 9 is shown separate from the first yoke 6 and the second yoke 7 in FIGS. 1 and 3 so that the arrangement of components is readily seen, the fourth yoke 9 actually is arranged as indicated by a broken line in FIG. 1. The fourth yoke 9 may be made of a magnetic material similar to the yoke 17.

Now, the magnetization of the first magnet 10, the second magnet 11 and the third magnet 12 will be described referring to FIG. 2. The first magnet 10 has a magnetic pole direction parallel with the circumferential direction S of the disk, while the second magnet 11 has a magnetic pole direction opposite to that of the first magnet 10. The third magnet 12 is magnetized in a two-divided manner and disposed to face the first magnet 10 and the second magnet 11 so that surfaces facing the first magnet 10 and the second magnet 11 respectively have magnetic poles opposite to those of the first magnet 10 and the second magnet 11. More specifically, one half 12a of the third magnet 12 is magnetized so that its S pole faces the N pole of the first magnet 10, while the other half 12b thereof is magnetized so that its N pole faces the S pole of the second magnet 11. In this manner, a magnetic flux K1 is formed in a magnetic gap between the first magnet 10 and the one half 12a of the third magnet, while a magnetic flux K2 opposite in direction to the magnetic flux K1 is formed in a magnetic gap between the second magnet 11 and the other half 12b of the third magnet 12. The magnetic fluxes K1 and K2, which are main magnetic fluxes, are supplied to the focusing coils 4R, 4L and the tracking coils 5R, 5L that are arranged in the magnetic gaps.

Figure 7:
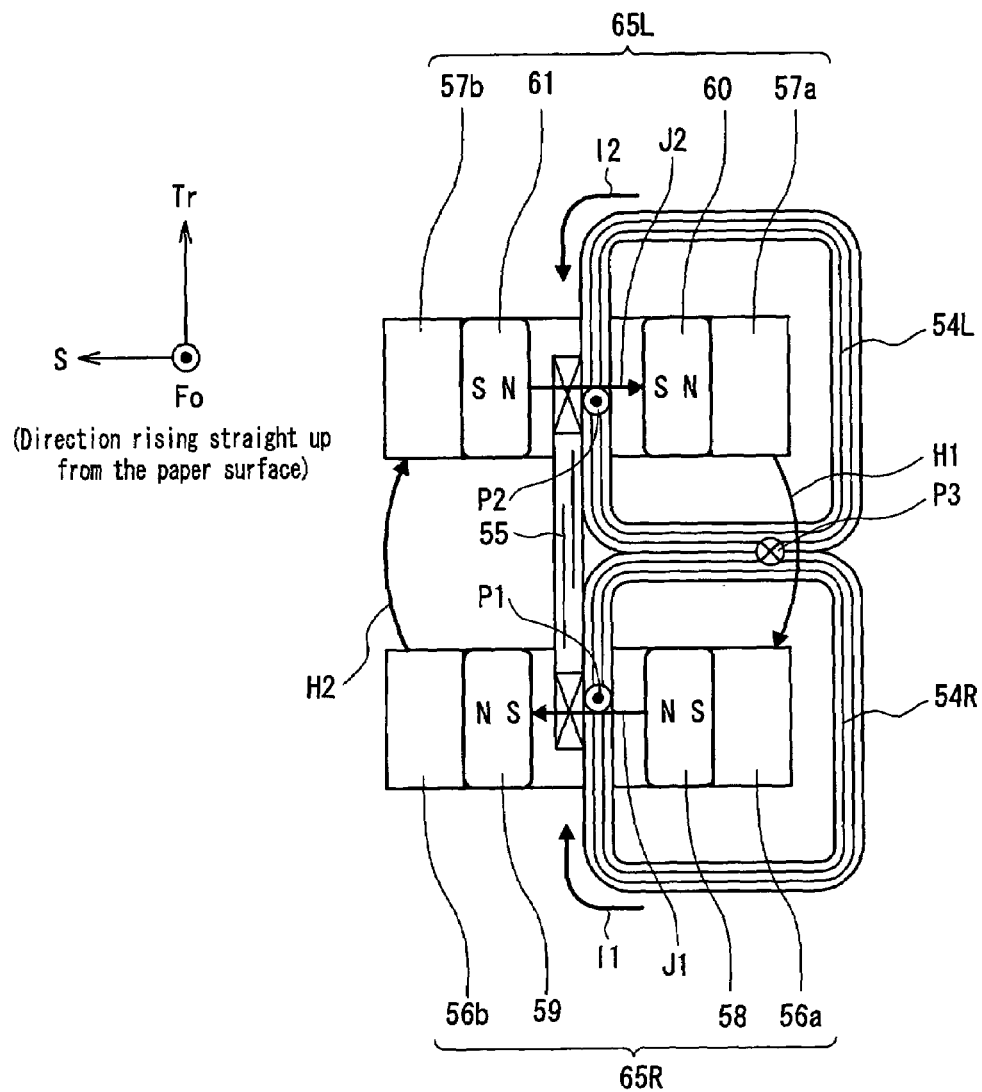
FIG. 7 is a plan view showing an arrangement of coils and magnets in the conventional objective lens driving device.

In this embodiment, a magnetic flux H3 in FIG. 2 corresponds to the leakage magnetic flux H1 in FIG. 7, which has posed a problem in the conventional example. In the present embodiment, since the magnetic flux H3 passes through the fourth yoke 9, it does not cross the focusing coil 4R or 4L. Also, the leakage magnetic flux H2 in FIG. 7 of the conventional example corresponds to a magnetic flux H4 in FIG. 2 passing through the two-pole magnetized third magnet 12 and the third yoke 8. The leakage magnetic flux H2 in the conventional example passes through the air, while the magnetic flux H4 efficiently passes via the magnetic material in the present embodiment. In accordance with the magnetization shown in FIG. 2 of the present invention, an efficient closed-loop magnetic path is formed from the magnetic flux K1, the magnetic flux H4, the magnetic flux K2 to the magnetic flux H3. Also, the fourth yoke 9 provides a bypass for the magnetic flux H3. Consequently, it is possible to suppress a leakage magnetic flux that crosses the focusing coils, which has caused a problem in the past.

The following is a description of an operation of the objective lens driving device constituted as above in the embodiment of the present invention, with reference to the accompanying drawings.

In FIG. 2, when an electric current 13 is supplied to the focusing coil 4R, an electromagnetic force in the focusing direction Fo is generated in a part subjected to the magnetic flux K1 (a point Q1) according to the Fleming's rule. Similarly, when an electric current 14 is supplied to the focusing coil 4L, an electromagnetic force in the focusing direction Fo is generated in a part subjected to the magnetic flux K2 (a point Q2). As a result, the movable portion 15 is driven in the focusing direction Fo. Since the magnetic flux H3 does not cross the focusing coils 4R and 4L, no unwanted force is generated unlike the conventional example.

In terms of driving in the radial tilting direction Ti, moment generated by a difference between the electric current 13 and the electric current 14, namely, a difference between the electromagnetic force in the focusing direction Fo acting on the focusing coil 4R and that acting on the focusing coil 4L allows the movable portion 15 to tilt around the circumferential direction of the disk (the arrow S direction). The movable portion 15 is driven in the focusing direction Fo and the radial tilting direction Ti similarly to the conventional objective lens driving device.

The operation of the objective lens driving device of the present invention and that of the conventional objective lens driving device are different in that the fourth yoke 9 provides a bypass for the magnetic flux H3, so that no magnetic flux crosses the focusing coils 4R and 4L between the first yoke 6 and the second yoke 7. Accordingly, no unwanted force in a direction opposite to the driving force is generated during the driving in the focusing direction Fo. Thus, not only a driving sensitivity improves, but also rotating vibrations around the tracking direction Tr, so-called pitching vibrations are suppressed.

Since the operation of passing an electric current thorough the tracking coils 5R and 5L so as to generate the electromagnetic force in the tracking direction Tr is similar to that for the focusing coils 4R and 4L, the description thereof will be omitted here.

In the present embodiment, the third magnet 12, which is a single two-pole magnetized magnet, is fixed firmly to the single third yoke 8. This forms the magnetic flux H4 passing through the third yoke 8 and the third magnet 12 and thus suppresses the generation of the magnetic flux passing through the air as the leakage magnetic flux H2 shown in FIG. 7 of the conventional example. Accordingly, a closed-loop magnetic flux circuit is formed together with the magnetic flux H3 passing through the fourth yoke 9, thus suppressing the generation of a leakage magnetic flux. Consequently, an effective magnetic flux increases, an efficiency of magnetic utilization improves, and a driving efficiency improves.

Figure 4:
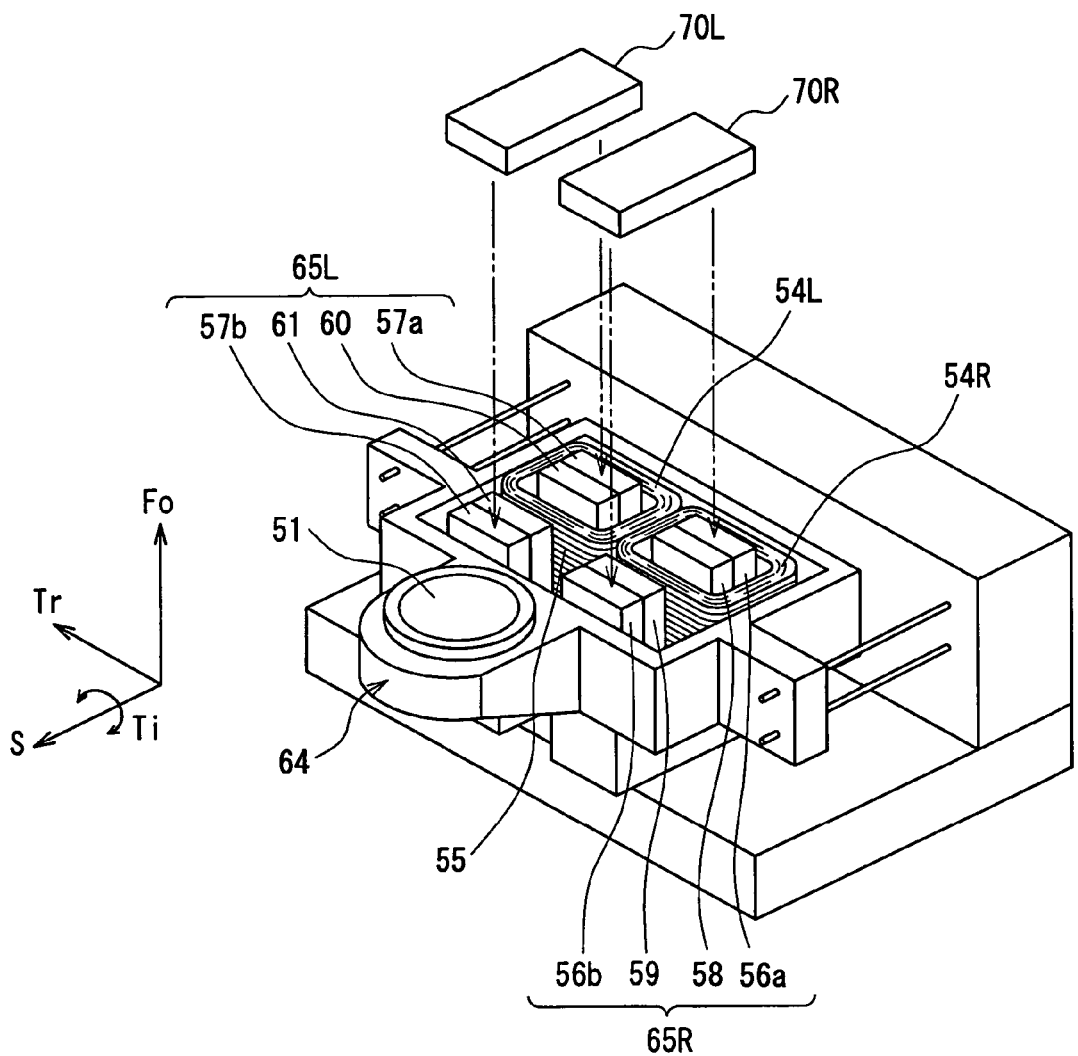
FIG. 4 is a perspective view showing an objective lens driving device capable of suppressing the generation of a leakage magnetic flux according to a comparative example.
Figure 6:
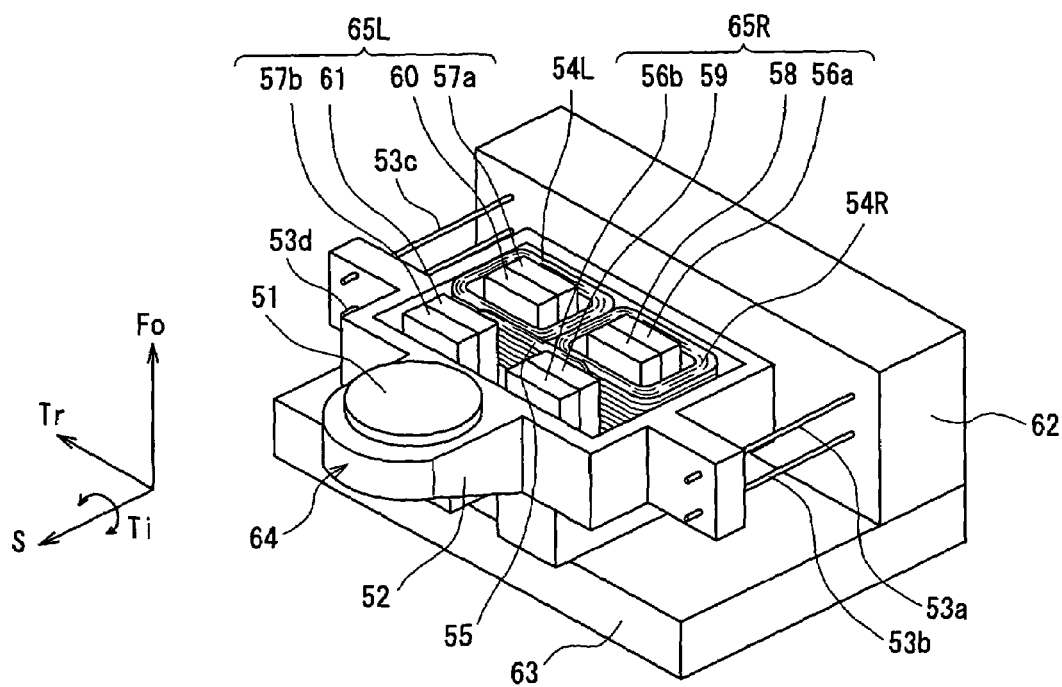
FIG. 6 is a perspective view showing a configuration of a conventional objective lens driving device.

As a method for suppressing the generation of the leakage magnetic fluxes H1 and H2 in the conventional magnetic flux circuit shown in FIGS. 6 and 7, fixing a first bridging yoke 70R to open ends of the yokes 56a and 56b so as to bridge the yokes 56a and 56b and fixing a second bridging yoke 70L to open ends of the yokes 57a and 57b so as to bridge the yokes 57a and 57b as shown in FIG. 4 can be considered. This forms a magnetic flux whose direction is opposite to the magnetic flux J1 in the first bridging yoke 70R and a magnetic flux whose direction is opposite to the magnetic flux J2 in the second bridging yoke 70L, thereby suppressing the generation of the leakage magnetic fluxes H1 and H2 passing through the air.

However, providing such first bridging yoke 70R and second bridging yoke 70L poses the following problems. First, since it becomes more likely that the tracking coil 55 will collide with the first bridging yoke 70R and the second bridging yoke 70L at the time of driving in the focusing direction Fo, the amount of movement of the movable portion 64 in the focusing direction Fo is restricted. Second, when the first bridging yoke 70R and the second bridging yoke 70L are located farther from the tracking coil 55 for the purpose of securing the amount of movement of the movable portion 64 in the focusing direction Fo, the thickness (the dimension along the focusing direction Fo) of the objective lens driving device increases. Third, when attempting to secure the amount of movement of the movable portion 64 in the focusing direction Fo while suppressing an increase in the thickness of the objective lens driving device, an effective dimension (especially, an effective dimension along the focusing direction Fo) of the tracking coil 55 cannot be secured sufficiently, hampering the improvement in the driving efficiency in the tracking direction.

In the above-described embodiment of the present invention, the magnetic flux H3 is allowed to pass through the fourth yoke 9 and the magnetic flux H4 is allowed to pass through the third yoke 8 and the third magnet 12, thereby suppressing the generation of a leakage magnetic flux so as to improve the driving efficiency. At the same time, it is possible to solve the above-mentioned problems of the configuration illustrated in FIG. 4, thus improving the driving efficiency in the tracking direction.

Although the magnet 12 is a single two-pole magnetized magnet in the embodiment described above, two single-pole magnetized magnets may be used instead as illustrated in FIGS. 6 and 7. In such a case, the effect of suppressing the pitching vibrations of the movable portion 15 also is the same. It should be noted, however, that a two-pole magnetized magnet is more advantageous in that a higher magnetomotive force can be set within a limited space.

Furthermore, in the embodiment described above, the third yoke 8 also may be divided into a portion facing the first yoke 6 and a portion facing the second yoke 7, as illustrated in FIGS. 6 and 7. In such a case, the effect of suppressing the pitching vibrations of the movable portion 15 also is the same. However, there is a possibility that the generation of a leakage magnetic flux may lower the driving efficiency.

In addition, although the two tracking coils 5R and 5L are provided so as to pair up with the two focusing coils 4R and 4L respectively in the above-described embodiment, a single tracking coil also can be used as illustrated in FIGS. 6 and 7.

Figure 5:
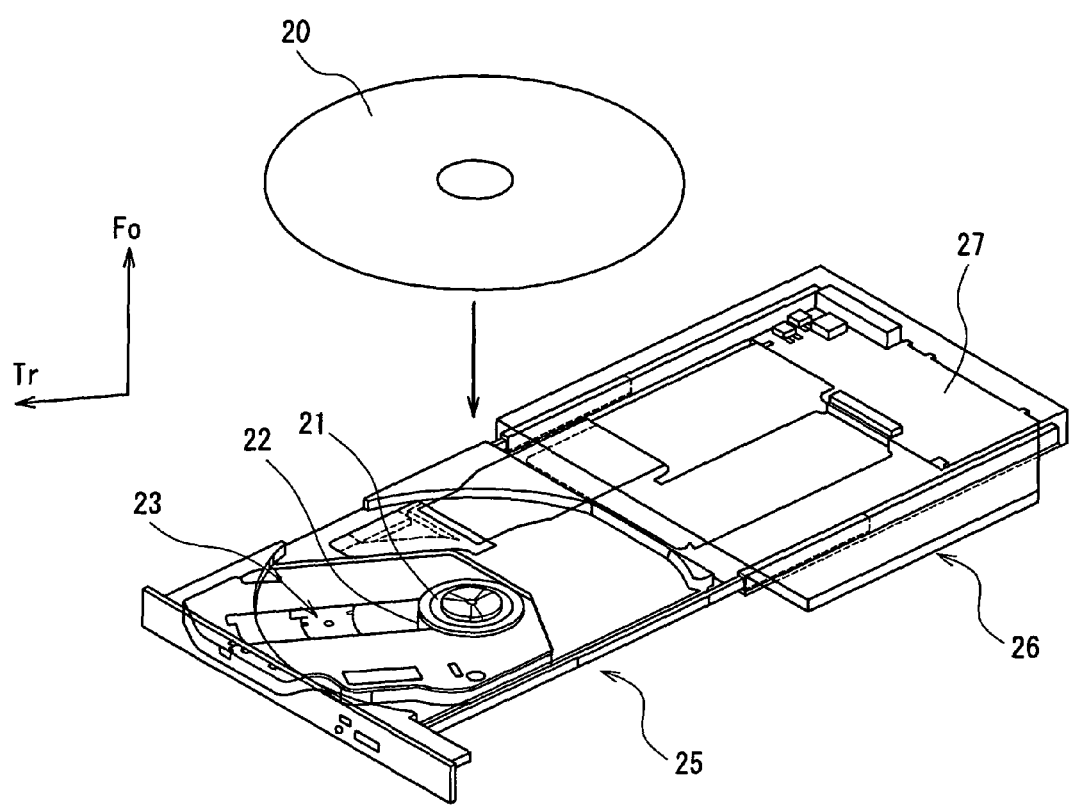
FIG. 5 is a perspective view showing an optical disk apparatus using the objective lens driving device of the present invention.

FIG. 5 is a perspective view showing an embodiment of an optical disk apparatus of the present invention, using the objective lens driving device constituted as above. The optical disk apparatus includes a spindle motor 22 provided with a turntable 21 on which an optical disk 20 as an information recording medium is to be mounted, an optical pickup 23 on which the above-described objective lens driving device is installed, and a traverse mechanism, which is not shown in this figure, for moving the optical pickup 23 in the tracking direction Tr. The traverse mechanism is stored and disposed in a tray portion 25. When the tray portion 25 is inserted into a main body 26, an information recording/reproducing operation begins based on a command signal from a circuit board 27. At the time of recording/reproducing the information, the objective lens is driven in the focusing direction and the tracking direction so as to achieve focus on an information recording position on the surface of the optical disk. Further, in the case where the optical disk is warped, a tilt control of the objective lens is necessary. By applying the objective lens driving device described in the above embodiment, it becomes possible to drive and control the objective lens in the radial tilting direction, thereby allowing corrections for an optical coma aberration.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An objective lens driving device comprising:
   an objective lens for focusing a light beam on a disk;
   a lens holder for holding the objective lens;
   a support for supporting the lens holder with respect to a fixing portion in a manner translatable in a focusing direction and a tracking direction and rotatable in a radial tilting direction; and
   a driving system for driving the lens holder along three axes of the focusing direction, the tracking direction and the radial tilting direction, the driving system comprising
      two focusing coils that are each wound in a substantially rectangular toroidal shape around a winding axis parallel with an optical axis direction of the objective lens,
      a tracking coil that is wound around a winding axis parallel with a circumferential direction of the disk and attached to outer surfaces of the focusing coils,
      a first magnet that has a magnetic pole direction parallel with the circumferential direction of the disk and is arranged inside one of the focusing coils,
      a second magnet that has a magnetic pole direction opposite to that of the first magnet and is arranged inside the other focusing coil,
      a third magnet and a fourth magnet that are arranged facing the first magnet and the second magnet respectively while forming a magnetic gap such that the tracking coil and the focusing coils are located in the magnetic gap,
      a first yoke that is located outside the magnetic gap and holds the first magnet,
      a second yoke that is located outside the magnetic gap and holds the second magnet, and
      a bridging yoke for connecting an open end of the first yoke and an open end of the second yoke.

2. The objective lens driving device according to claim 1, further comprising a third yoke that is arranged outside the magnetic gap and holds both the third magnet and the fourth magnet.

3. The objective lens driving device according to claim 1, wherein the third magnet and the fourth magnet are provided as a single two-pole magnetized magnet.

4. An optical disk apparatus comprising the objective lens driving device according to claim 1.

* * * * *